3,101,403
METHOD OF JOINING CARBON

John G. Lewis and Harold A. Ohlgren, Ann Arbor, Mich., assignors, by mesne assignments, to American Metal Products Company, Detroit, Mich., a corporation of Michigan
No Drawing. Filed Dec. 28, 1959, Ser. No. 862,075
13 Claims. (Cl. 219—117)

This invention concerns the joining of carbon pieces together into a single piece which, including the bond, has properties of resistance to temperature, electrical and thermal conductivity, and corrosion resistance, and the mechanical strength approaching those of the carbon itself. The invention is particularly concerned with the joining of graphite pieces into strong functional structures such as furnaces, nuclear reactor parts and the like.

Carbon has several unique properties which have led to its widespread use for scientific and engineering purposes. Probably its most outstanding advantage is the fact that carbon does not melt at atmospheric pressure and can be heated to temperatures in excess of 5000° F. before subliming. Hence, it is in demand for structural parts of high temperature furnace units and other high temperature uses.

Graphite is electrically and thermally conducting which properties have led to its use in electrodes, heat exchange units and the like. An unusual property of more recent interest is that of slowing down fast neutrons from a nuclear chain reaction, causing them to reach reduced speeds where they will react with fissionable material and, thus, permitting the nuclear chain reaction to continue.

Another application of great interest is that of using graphite for nozzles and other high temperature parts required in jets and rocket engine manufacture. Here again, it is desirable to make use of the readily available sizes of graphite and to join these parts together in refractory, impervious, corrosion-resisting joints so that assemblies larger than readily available single pieces can be built up and used with confidence.

An approach to this problem which has been found to be somewhat attractive involves a cementing composition comprising a metal powder (e.g. titanium) and a carbonaceous agglutinant (e.g. sugar) which is coated on the carbon surface to be joined; assembling the parts in position; and heating in a non-oxidizing atmosphere. In this manner a carbide of the metal (e.g. titanium carbide) is formed to act as the binding agent.

This type of bond has been unsatisfactory principally because it forms a relatively sharp boundary between the metal carbide phase and the carbon phase. Such a bond may be satisfactory at a low temperature but fails at high temperatures because metal carbides will, in general, expand thermally several times as rapidly as the graphite to produce a very severe strain on the bond.

Similarly some deficiency in the strength of such a bond can be traced to the presence of foreign matter, including occluded gases, which become entrapped between the carbon and the cement composition.

It is therefore an object of this invention to provide an article of manufacture and a new method for bonding carbon to carbon, particularly graphite to graphite, to secure a strong bond with no significant loss of thermal conductivity, electrical conductivity, resistance to thermal shock, corrosion resistance or significant loss of any other valuable property of carbon.

It is a further object to provide a method of bonding carbon to carbon to produce an article without a relatively sharp boundary between the carbon and a cementing phase of substantially different thermal coefficient of expansion.

It is still a further object to provide a method of bonding carbon to carbon wherein the cementing phase penetrates deeply into the pores of the carbon pieces which pores have been freed of the normally occurring occluded gases.

It is yet another object to provide a method with the foregoing objectives wherein the method can be readily carried out in the shop or in the field.

It has been found that the foregoing and related objects can be secured in the method which comprises placing together the carbon surfaces to be joined; causing a metal selected from the metals of group IV-A, group V-A, and group VI-A of the periodic table of the elements to diffuse into said carbon surfaces for a time sufficient to secure more than superficial penetration of said metal into said carbon and at a temperature sufficient to effect the formation of the carbide of said metal at points within the body of said carbon.

The use of carbides of the metals of group IV-A, group V-A, and group VI-A to form the bond will, in general, result in carbides having very high tensile and compressive strengths and melting at very high temperatures. The exact metal to be chosen depends somewhat on the characteristics desired in the finished article. For example, titanium carbide is especially suitable in turbine blades because it has high temperature strength and other mechanical properties which are comparable with graphite under the conditions found in this use. Titanium, zirconium, tantalum, niobium, and hafnium are specific examples of the metals of the invention.

A feature of the present invention is the formation of a metal carbide bond which does not form a sharply bonded phase but rather presents a gradual concentration gradient from the relatively pure metal carbide in the center of the joint to the relatively pure carbon phase of the pieces being joined. By this means we have overcome the excessive breakage of bonds of the type already referred to wherein the metal carbide is limited substantially to the carbon surfaces with superficial penetration, the breakage being induced during heating because of the difference in coefficient of thermal expansion between carbon and the metal carbide.

Within the broad scope of our invention it is desired to point out the great advantages of carrying out the bonding methods of the invention in a vacuum. The first major advantage of vacuum operation is the removal of occluded gases from the surfaces and pores of the carbon. In this manner fluid metal not only penetrates the pores of the carbon more completely and more deeply but it does so more rapidly. In this connection it can be pointed out that speed of penetration of metal is important especially where the melting point of the metal involved is above or approaches the temperature of fairly rapid reaction between the metal and the carbon. In other words, it is desirable to secure deep penetration of metal before the complete formation of carbide occurs.

Vacuum operation has a second major advantage in that it permits the formation of metal vapor at a relatively lower temperature. This again effects greater penetration of the metal into the carbon and creates a greater increment between what we might call the temperature of penetration and the temperature of rapid carbide formation. In this latter case we have the most advantageous sequence of events for maximum penetration with maximum bonding strength. This method comprises placing together in a chamber the carbon surfaces to be bonded; evacuating the chamber; contacting said surfaces with fluid metal, said contact being made at a temperature above the melting point of the metal for a period of time sufficient to secure more than superficial penetration of the metal into the carbon; and then raising the temperature to the point necessary to completely convert said metal to metal carbide.

Where a vacuum is not used, an alternative non-reactive atmosphere must be chosen. A blanket of noble gas (e.g. helium or argon) can be used. The latter is particularly advantageous in field operations, as in repair work, where it would be inconvenient or impossible to evacuate the atmosphere in the proximity of the joint or crack to be bonded.

It is essential that one should not attempt the carbide joining of carbon unprotected from air, because both the oxygen and the nitrogen of the air are harmful to this process. The nitrogen is most harmful because nitrides of the metal used will form and preempt the metal. The nitrides are generally more stable than the oxides and generally do not react with carbon. The metal oxides on the other hand will react with carbon to form gaseous oxides of carbon, probably CO, and free metal. Thus, it is less serious for some oxygen to be present during joining by the disclosed process than for nitrogen to be present, but both oxygen and nitrogen should be excluded when carrying out the disclosed process.

In the shop operations where permanent equipment can be installed, we recommend placing the carbon pieces to be bonded in a vacuum furnace where vacuum and temperature can be best controlled. In field operations, however, one of the best and most available sources of heat is the electric arc. Thus, welding techniques with a protective gas atmosphere can be adpted to the methods of the invention and provide sufficient fluid metal at a high enough temperature to provide for reaction of metal and carbon.

One particularly advantageous method of using welding techniques is to use a welding rod of the metal desired for the bond. Thus, the method comprises placing the carbon surfaces together in a non-oxidizing atmosphere such as provided by argon, helium, or other noble gas; bringing into the proximity of said surfaces a welding rod made of one of the metals of the invention; and striking an electric arc between said rod and said carbon for a period of time sufficient for penetration of the resultant fluid metal into said carbon.

We have also discovered that a carbon welding rod, coated with an oxide of the metal of the invention can be used. In this case we found there is sufficient carbon vapor formed in the arc to reduce the metal oxide to fluid metal but an insufficiency of carbon in a reactive form to cause the substantial exclusive formation of metal carbide outside the surfaces to be joined. Thus, this technique can provide sufficient fluid metal for deep penetration of the carbon.

The previous method of using a carbon electrode, or welding rod, can be varied to increase the rate and quantity of metal flow by increasing the quantity of metal oxide and adding some powdered carbon (e.g., graphite) to assist in its reduction. Thus, a composition of metal oxide, carbon, and a binder can be used to coat the welding rod. In this connection, however, it is important to use sufficient excess of metal oxide relative to reactive carbon, to be inhibitory of the substantially exclusive formation of metal carbide outside the carbon surfaces to be bonded.

Another variation in welding techniques which can be used is the use of a non-consumable electrode, such as tungsten, while feeding into the electric arc a wire, rod, or the like of a metal of the invention.

*Example I*

Two hollow cylindrical graphite pieces each having an inside diameter of about .75 inch, an outside diameter of 1.25 inch, and 3 inches in length were placed in an electric furnace with a surface of one piece touching the surface of the other. Some titanium metal (sponge) of about 99% purity was placed on the crack formed between the adjoining graphite surfaces. The furnace was evacuated to within the range of 1-10 microns (although a range of 1-100 microns is satisfactory) so as to remove substantially all air and other gases, and to remove volatile hydrocarbons from the graphite so that they would not impede the flow of molten titanium into the graphite interstices and to prevent the gases from reacting with the titanium and partially solidifying the titanium. Absolute pressures higher than about 100 microns not only impede rapid penetration of the titanium metal into the graphite but in addition usually cause concentration gradients of metal which are too sharp, which tends to cause separation of carbide joint and graphite base by differential thermal contraction. Under proper vacuum the furnace was heated relatively rapidly to about 3000° F. and then more slowly to about 4000° F. During the heating above about 3000° F. the titanium vaporized and filled the joint between the carbon surfaces as well as penetrating several inches into the carbon pieces. As the temperature continued to rise the titanium reacted with the carbon to form a titanium carbide bond. The parts were heated above 4000° F. for about 20 minutes to insure that all of the titanium had been converted to titanium carbide. The original crack was filled with a substantially pure titanium carbide phase which decreased in concentration gradually over several inches in each direction to a substantially pure carbon phase. The resulting bond was strong at elevated temperatures.

*Example II*

Two graphite pieces as described in Example I were placed side by side in such a manner that one piece touched a surface of the other piece. A titanium rod was used in conjunction with a 200 ampere D.C. Lincoln Welder which directed a stream of helium into the work area in order to minimize contact with air. An electric arc was struck between the titanium rod and the graphite adjacent the joint between the two pieces of graphite and fluid titanium flowed into the joint and into the pores of the graphite. The temperature of the arc was approximately 7000° F. Again there was sufficient penetration of metal to give a satisfactory wide band of titanium carbide for strength during subsequent heating of the bond. To get a completely carburized titanium joint a separate heating step is desirable, preferably to about 4000° F. in a vacuum.

The same procedure as outlined above was used with graphite pieces $\frac{1}{16}$ inch and $\frac{1}{2}$ inch in thickness. These were girth joints on cylinders and cones of about 6-12 inch diameter. Strong bonds were obtained.

A similar experiment was carried out using argon instead of helium and equally satisfactory results were achieved.

*Example III*

Two graphite pieces of the type set forth in Example I were placed side by side in such a manner that a surface of one piece touched the surface of the other piece. A carbon rod was coated with a composition comprising a large proportion of titanium dioxide and a minor proportion of a starch binder. The carbon rod was connected to a welding machine (200 ampere D.C. Lincoln Welder) which directed a stream of helium into the work area. An electric arc was struck between the carbon rod and the graphite adjacent the joint between the two pieces of graphite. As a consequence of the seat of the arc and the presence of carbon vapor in the arc, fluid titanium penetrated the pores of the graphite pieces and the joint between them. It was found that titanium carbide had formed. A good bond was formed.

The same procedure was repeated with the exception that the product was further heated to about 4000° F. in a vacuum. It was found that this procedure assured more complete conversion to titanium carbide.

We have also had good success using a Linde Heli-Arc torch on a 200 ampere D.C. Lincoln Welder. Argon was flowed through the torch, which uses a tungsten electrode.

A number of the joints made in accordance with the above examples were subjected to high temperature high velocity gas flows and remained intact, which was proof of the high bond strengths obtained.

One problem which is sometimes encountered in these welding procedures is cracking at areas where rewelding or joining the end to the beginning of a circular joint is necessary. It has been found that reheating to 4000° F. in a vacuum with a little excess metal helps to rejoin such cracks successfully. A procedure more adapted to field fabrication methods is to place some titanium oxide over the area to be rewelded before the rewelding is undertaken. The oxide reacts with carbide previously laid down and helps to free some titanium metal. This is then reconverted to carbide, but helps to smooth the transition.

The foregoing examples were repeated using various metals of group IV-A, group V-A, and group VI-A of the periodic table of the elements. The objectives of the invention were secured with these metals.

A variety of structural units can be made using the methods of the invention and in the manner illustrated in the examples. Of particular interest are carbon structural units in electric furnaces, in rocket engines, and in nuclear reactors. It is no longer necessary to use large, expensive, specially fabricated carbon parts for these uses. Rather, one can now use the relatively inexpensive, smaller and more readily available carbon pieces and bond them into the desired structural shapes.

We claim:

1. The method of bonding two surfaces of two carbon members to each other which comprises placing said surfaces together in a non-reactive atmosphere; subjecting said surfaces and said members adjacent said surfaces and a metal selected from the metals of group IV-A, group V-A, and group VI-A of the periodic table of the elements to external heat at a temperature above 3000° F. sufficient to melt said metal and cause it to diffuse into said carbon surfaces and penetrate into said carbon members adjacent said surfaces; and subsequent to such penetration, maintaining a temperature sufficient to effect the formation of the carbide of said metal.

2. The method of claim 1 wherein the metal is titanium.

3. The method of claim 1 wherein the metal is zirconium.

4. The method of claim 1 wherein the metal is tantalum.

5. The method of claim 1 wherein the metal is niobium.

6. The method of claim 1 wherein the metal is hafnium.

7. The method of claim 1 wherein the non-reactive atmosphere is a vacuum.

8. The method of claim 1 wherein the non-reactive atmosphere is a noble gas.

9. The method of bonding carbon surfaces to each other which comprises placing said surfaces together in a non-reactive atmosphere; bringing into the proximity of said surfaces a welding rod made of a metal selected from the metals of group IV-A, group V-A, and group VI-A of the periodic table of the elements; and striking an electric arc between said rod and said carbon for a period of time sufficient to melt said metal and cause said metal to penetrate a substantial distance into said carbon surfaces.

10. The method of bonding carbon surfaces to each other which comprises placing said surfaces together in a non-reactive atmosphere; bringing into the proximity of said surfaces a carbon welding rod coated with metal oxide wherein the metal of said metal oxide is selected from the metals of group IV-A, group V-A, and group VI-A of the periodic table of the elements; and striking an arc between said rod and said carbon for a period of time sufficient for penetration of the resultant fluid metal into said carbon.

11. The method of bonding carbon surfaces to each other which comprises placing said surfaces together in a non-reactive atmosphere; bringing into the proximity of said surfaces a graphite welding rod coated with powdered graphite, a binder, and a metal oxide, wherein the metal of said metal oxide is selected from the metals of group IV-A, group V-A, and group VI-A of the periodic table of the elements, and wherein said metal oxide concentration relative to said graphite and said binder is inhibitory of the substantially exclusive formation of metal carbide outside said surfaces; and striking an arc between said rod and said carbon for a period of time sufficient for penetration of the resultant fluid metal into said carbon.

12. The method of bonding carbon surfaces to each other which comprises placing said surfaces together in a non-reactive atmosphere; bringing into the proximity of said surfaces a non-consumable welding rod; striking an arc between said rod and said carbon while feeding into said arc a metal selected from the metals of group IV-A, group V-A, and group VI-A of the periodic table of the elements so as to melt said metal, directing the flow of said molten metal onto said surfaces and maintaining said arc for a time sufficient for penetration of the metal substantial distances into said carbon surfaces.

13. The method of claim 12 wherein the non-consumable electrode is tungsten.

References Cited in the file of this patent
UNITED STATES PATENTS

| | | |
|---|---|---|
| 2,431,975 | Yockey et al. | Dec. 2, 1947 |
| 2,866,886 | Koehring | Dec. 30, 1958 |
| 2,979,813 | Steinberg | Apr. 18, 1961 |
| 2,979,814 | Steinberg | Apr. 18, 1961 |